United States Patent
Schmidt

(10) Patent No.: US 12,512,523 B2
(45) Date of Patent: Dec. 30, 2025

(54) TWO-PART REFERENCE ELECTRODE

(71) Applicant: Bayerische Motoren Werke Aktiengesellschaft, Munich (DE)

(72) Inventor: Jan Philipp Schmidt, Holzmaden (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 965 days.

(21) Appl. No.: 17/594,010

(22) PCT Filed: Mar. 26, 2020

(86) PCT No.: PCT/EP2020/058540
§ 371 (c)(1),
(2) Date: Sep. 30, 2021

(87) PCT Pub. No.: WO2020/201009
PCT Pub. Date: Oct. 8, 2020

(65) Prior Publication Data
US 2022/0158263 A1 May 19, 2022

(30) Foreign Application Priority Data

Apr. 4, 2019 (DE) ...................... 10 2019 108 921.2

(51) Int. Cl.
*H01M 10/48* (2006.01)
*G01N 27/30* (2006.01)
(Continued)

(52) U.S. Cl.
CPC .......... *H01M 10/48* (2013.01); *G01N 27/301* (2013.01); *G01R 31/389* (2019.01);
(Continued)

(58) Field of Classification Search
CPC ............. H01M 10/48; H01M 10/0525; H01M 10/486; H01M 50/569; G01N 27/301; G01R 31/389
See application file for complete search history.

(56) References Cited

U.S. PATENT DOCUMENTS

| | | | |
|---|---|---|---|
| 2004/0063152 | A1 | 4/2004 | Gumbrecht et al. |
| 2009/0104510 | A1 | 4/2009 | Fulop et al. |

(Continued)

FOREIGN PATENT DOCUMENTS

| | | | |
|---|---|---|---|
| CN | 104103851 A | 10/2014 | |
| CN | 104821417 A | 8/2015 | |

(Continued)

OTHER PUBLICATIONS

Chinese-language Office Action issued in Chinese Application No. 202080021991.5 dated Jan. 10, 2024 with English translation (16 pages).

(Continued)

*Primary Examiner* — Adam A Arciero
(74) *Attorney, Agent, or Firm* — Crowell & Moring LLP

(57) ABSTRACT

A two-part reference electrode for measuring impedance in a lithium-ion cell includes a first part (electrode $Ref_1$) and a second part (electrode $Ref_2$), each of which includes a metallic conductor. The first part and the second part are attached to a substrate separately from each other, and have a substantially constant spacing. The separator of the lithium-ion cell can act as a substrate. The electrode can be used for determining temperature and for detecting degradation of the electrode or electrolyte by way of impedance measurement. The electrode can also be used as a reference electrode for measuring half-cell potentials.

14 Claims, 4 Drawing Sheets

Cathode

Separator

Ref₁           Ref₂

Ceramic layer

Anode

(51) Int. Cl.
  *G01R 31/389* (2019.01)
  *H01M 10/0525* (2010.01)
  *H01M 50/417* (2021.01)
  *H01M 50/489* (2021.01)
  *H01M 50/569* (2021.01)

(52) U.S. Cl.
  CPC ..... *H01M 10/0525* (2013.01); *H01M 10/486* (2013.01); *H01M 50/417* (2021.01); *H01M 50/489* (2021.01); *H01M 50/569* (2021.01)

(56) References Cited

U.S. PATENT DOCUMENTS

| | | |
|---|---|---|
| 2011/0250478 A1 | 10/2011 | Timmons et al. |
| 2013/0307487 A1 | 11/2013 | Matthe et al. |
| 2014/0272547 A1 | 9/2014 | Ramasubramanian et al. |
| 2014/0375325 A1 | 12/2014 | Wang et al. |
| 2015/0214582 A1 | 7/2015 | Skwarek et al. |
| 2015/0276884 A1 | 10/2015 | Andoh et al. |
| 2016/0149272 A1 | 5/2016 | Imaizumi |
| 2016/0259011 A1 | 9/2016 | Joe |
| 2016/0294016 A1 | 10/2016 | Asai et al. |
| 2016/0363557 A1* | 12/2016 | Schenk ............... G01N 27/126 |
| 2018/0151922 A1 | 5/2018 | Ito et al. |
| 2019/0064275 A1 | 2/2019 | Han et al. |
| 2019/0072613 A1 | 3/2019 | Schmidt |

FOREIGN PATENT DOCUMENTS

| | | |
|---|---|---|
| CN | 105308786 A | 2/2016 |
| DE | 10 2009 038 663 A1 | 7/2011 |
| DE | 10 2011 015 792 A1 | 12/2011 |
| DE | 10 2013 103 921 A1 | 11/2013 |
| DE | 10 2014 001 260 A1 | 7/2015 |
| DE | 10 2018 003 703 A1 | 1/2019 |
| EP | 2 316 985 A2 | 5/2011 |
| EP | 2 667 166 A2 | 11/2013 |
| EP | 3 413 387 A1 | 12/2018 |
| JP | 2011-3314 A | 1/2011 |
| JP | 2012-79582 A | 4/2012 |
| JP | 2015-111600 A | 6/2015 |
| JP | 2015-191878 A | 11/2015 |
| JP | 2016-48213 A | 4/2016 |
| JP | 2016-99199 A | 5/2016 |
| JP | 2016-517618 A | 6/2016 |
| JP | 2016-192371 A | 11/2016 |
| KR | 10-2015-0043214 A | 4/2015 |
| KR | 10-2016-0034434 A | 3/2016 |
| KR | 10-2018-0045374 A | 5/2018 |
| WO | WO 03/041209 A2 | 5/2003 |
| WO | WO 2009/036444 A2 | 3/2009 |

OTHER PUBLICATIONS

Japanese-language Office Action issued in Japanese Application No. 2021-556334 dated Jan. 10, 2024 with English translation (4 pages).

Korean-language Office Action issued in Korean Application No. 10-2021-7028432 dated Jul. 28, 2023 with English translation (13 pages).

International Search Report (PCT/ISA/210) issued in PCT Application No. PCT/EP2020/058540 dated Jul. 14, 2020 with English translation (five (5) pages).

German-language Written Opinion (PCT/ISA/237) issued in PCT Application No. PCT/EP2020/058540 dated Jul. 14, 2020 (five (5) pages).

German-language Search Report issued in German Application No. 10 2019 108 921.2 dated Dec. 17, 2019 with partial English translation (13 pages).

\* cited by examiner

Anode      Ref$_1$     Ref$_2$      Cathode

TWO-PART REFERENCE ELECTRODE

BACKGROUND AND SUMMARY OF THE INVENTION

The present invention relates to a reference electrode for measuring the impedance of a lithium ion cell and also a lithium ion cell which comprises the reference electrode.

Electrochemical impedance spectroscopy (EIS) is an established method which can be used, inter alia, for characterizing lithium ion cells. It comprises the application of an excitation signal to the cell, which signal can be an alternating current signal (I(t), galvanostatic) or an alternating potential signal (U(t), potentiostatic), measurement of the corresponding response signal (U(t) or I(t)) and calculation of the generally complex impedance Z from the excitation signal and the response signal as U(t)/I(t). To record a spectrum, the frequency of the excitation signal can be varied, or a plurality of frequencies can be superimposed. As an alternative, a pulse representing a superposition of many frequencies can also be used, and the spectrum is obtained by Fourier transformation.

The use of impedance measurement or impedance spectroscopy for diagnosing the state of lithium ion cells and in particular also for determining the temperature is known in the prior art. Compared to a direct temperature measurement with the aid of a sensor on or in the cell housing, this has the advantage that the temperature in the electrochemically active region of the electrode arrangement, which can differ from the housing temperature, is determined directly. DE 10 2009 038 663 describes a motor vehicle having a plurality of batteries which in each case are separated individually or blockwise from the on-board grid and can be connected to a diagnosis device for carrying out a model-based battery diagnosis method. The diagnosis method can also encompass a measurement of the impedance.

DE 10 2013 103 921 relates to cell temperature measurement and degradation measurement in lithium battery systems of electrically powered vehicles by determination of the cell impedance on the basis of an alternating potential signal prescribed by an inverter. The method is based on the observation that the course of the plot of impedance against signal frequency is temperature-dependent.

EP 2 667 166 A2 relates to a method for determining the temperature by measuring the imaginary part of the impedance at a number of frequencies and determining the frequency at which the imaginary part goes through zero. The method is based on the observation that the frequency of the zero position depends essentially on the temperature at a given charging and ageing state of the cell.

In the above methods of the prior art, both the application of the excitation signal and the measurement of the response signal is carried out between the working electrodes (i.e. anode and cathode).

The use of reference electrodes in lithium ion batteries is described in the prior art first and foremost for measuring the potential of half cells. In this way, it is possible to determine the potential of the anode or cathode individually, which makes it possible to draw conclusions as to the ageing state of the electrodes.

US 2014/0375325 describes a lithium ion cell having an integrated, electrochemically active reference electrode. The electrode arrangement of the cell has at least one electrode section having a single-sided active material coating and a porous current collector. A separator and the reference electrode are installed on the other side of the section. The electrode section with the reference electrode can, according to the embodiments described, be localized, for example, on the outermost layer of the roll or in the center of the roll or at the periphery or in the interior of the stack.

WO 2009/036444 relates to a lithium ion cell having an electrochemically active reference electrode which is installed in the interior of the cell housing but outside the electrode roll or stack.

DE 10 2014 001260, on the other hand, describes a battery which has an integrated reference electrode for measuring the impedance. In addition, further reference electrodes for measuring the redox potential can be provided. A method for determining the ageing state by way of impedance and/or redox potential measurement using the reference electrode(s) is likewise described. Here, the impedance can be measured both between the two working electrodes and between working electrode and reference electrode. The ageing state of the working electrodes can be determined individually in this way.

In the above-described methods of the prior art, the excitation signal I(t) is applied to the working electrodes of the cells, for example to the entire cell train using the inverter or to the balancing current circuit of the individual cells. The impedance values are typically low and can be, for example, in the mOhm range. To determine the temperature, the impedance Z has to be determined with very high accuracy. For this purpose, a correspondingly high excitation current according to $Z=U(t)/I(t)$ is necessary, which conversely means that the low impedance value at a prescribed excitation circuit limits the precision of the temperature measurement. In addition, an average temperature of the cell is determined in all cases, but no local resolution is possible.

Furthermore, it is difficult to draw detailed conclusions in respect of the fundamental changes to electrolyte and/or electrodes on the basis of observed impedance changes in order to detect undesirable phenomena such as electrolyte degradation or Li plating on the anode at an early juncture when using the conventional methods.

In view of these problems, it is an object of the present invention to provide a method which makes it possible to measure the temperature by way of impedance spectroscopy with increased precision and local resolution and which allows early recognition of degradation of the electrolyte and/or the electrodes.

According to embodiments of the invention, this object is achieved by the use of a two-part reference electrode comprising:
 a first subelectrode $Ref_1$ which comprises an electrical conductor;
 a second subelectrode $Ref_2$ which comprises an electrical conductor;
 wherein the two subelectrodes $Ref_1$ and $Ref_2$ have been applied electrically separately from one another to a substrate and have an essentially constant spacing $d_1$.

The reference electrode can be configured so that the transition of charge (lithium ions) to the surroundings (typically the electrolytes of the cell in which the electrode is used) is possible (known as non-blocking electrode) or the charge transition can be blocked (known as blocking electrode), for example by operation at a potential at which no lithium can be exchanged or by application of a lithium-impermeable coating.

The reference electrode of embodiments of the invention can be used at least for the following diagnoses:
 (i) temperature determination via electrolyte conductivity;
 (ii) detection of covering layers or lithium plating; and (iii) determination of Li ion concentration in the electrolyte via the dielectric properties at the interface of the subelectrodes $Ref_1$ and $Ref_2$, and when using a blocking electrode also with variation of a direct voltage signal superposed on the alternating signal.

In the case of configuration as non-blocking electrode, it can also be used as reference electrode for half-cell potential measurement.

DETAILED DESCRIPTION OF THE DRAWINGS

The structure of the reference electrode according to embodiments of the invention, its mode of operation, its use in a lithium ion cell and the associated method for measuring the impedance are described in detail below.

Subelectrodes $Ref_1$ and $Ref_2$

The reference electrode of embodiments of the invention comprises two subelectrodes $Ref_1$ and $Ref_2$ which each comprise an electrical conductor and are arranged electrically separately from one another at an essentially constant spacing $d_1$ on a substrate. After introduction into the cell, an impedance arises between $Ref_1$ and $Ref_2$ as a result of contact with the electrolyte, and this impedance can be measured.

The material of the electrical conductor is not subject to any specific restrictions, as long as it is chemically and electrochemically inert under the operating conditions. Possibilities are, for example, metallic conductors, semiconductors, which can optionally be doped, graphite or conductive polymers. Metallic conductors are preferred, in particular nickel, copper, silver, gold, platinum metals or alloys of these, and gold is more preferred in respect of chemical resistance and low layer thickness.

The two subelectrodes $Ref_1$ and $Ref_2$ are arranged at an essentially constant spacing $d_1$. This means that the spacing of the subelectrodes is constant over the major part of their length, typically 70% or more, preferably 80% or more, in particular 90% or more. The spacing $d_1$ is generally from 10 μm to 1 mm, preferably from 20 μm to 500 μm, in particular from 50 μm to 200 μm.

The subelectrodes can, for example, be configured as parallel conductor tracks, wires or strip conductors at a spacing $d_1$, which can in turn be arranged in a zig-zag pattern, rectangular wave pattern or meandering pattern on the substrate.

Figure 1:
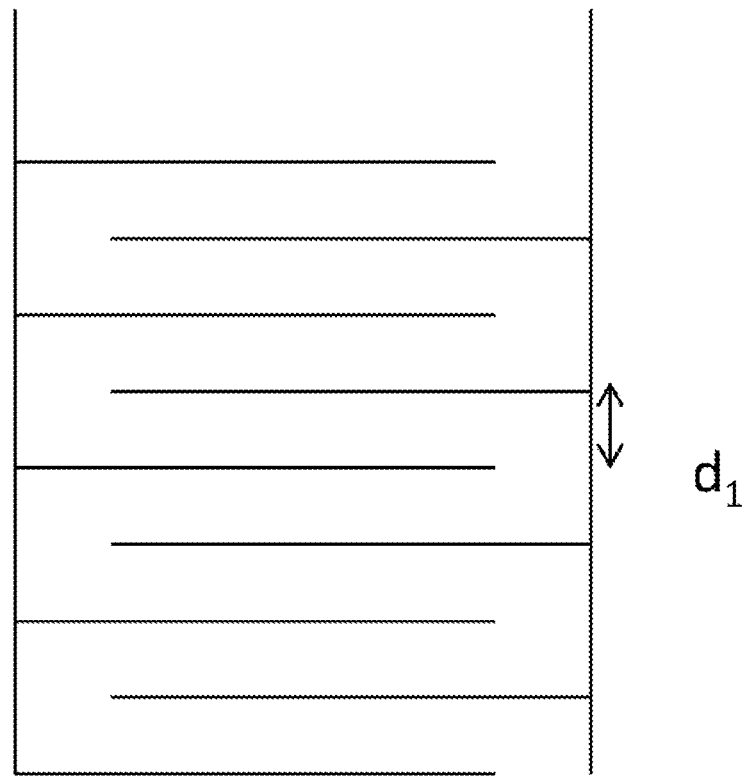
FIG. 1 schematically shows an embodiment of the reference electrode of the invention in which the two subelectrodes $Ref_1$ and $Ref_2$ each have an essentially comb-like shape. The teeth of the combs are intermeshed, with the spacing between the teeth of one comb and of the other comb being $d_1$.

In a preferred embodiment, the subelectrodes each have an essentially comb-like structure, i.e. they comprise a shaft section and a plurality of tooth sections projecting therefrom (hereinafter referred to as "shaft" and "teeth" in the interests of simplicity). The angle at which the teeth project is essentially the same for all teeth of both combs and is preferably a right angle. The two comb-like subelectrodes are arranged parallel to one another, so that the teeth of one comb mesh with those of the other and the spacing is in each case $d_1$. FIG. 1 illustrates this embodiment.

The spacing of the comb shafts from one another is ultimately limited by the electrode geometry of the cell and is, for example, from 100 μm to 5 cm, preferably from 1 mm to 2 cm, in particular from 5 mm to 1 cm. In the case of teeth arranged at a right angle, this spacing is approximately the sum of $d_1$ and the length of the teeth.

For trouble-free integrability into the cell, the thickness of the two subelectrodes is preferably 10 μm or less, more preferably 1 μm or less, particularly preferably 500 nm or less. In a preferred embodiment, the layer thickness is from 10 to 100 nm, which can be realized by, for example, vapor deposition processes (e.g. sputtering of a 20 nm gold film).

The width can be the same as the thickness, or the two subelectrodes can be broadened in order to increase the surface area of the reference electrode and thus reduce the resistance relative to the electrolyte.

Accordingly, the two subelectrodes can, for example, have an essentially round or square cross section and, for instance, be configured in the form of thin wires, they can be strip-like with a rectangular cross section or they can be made up of flat sections which are joined by wire-like or strip-like sections.

Figure 2:
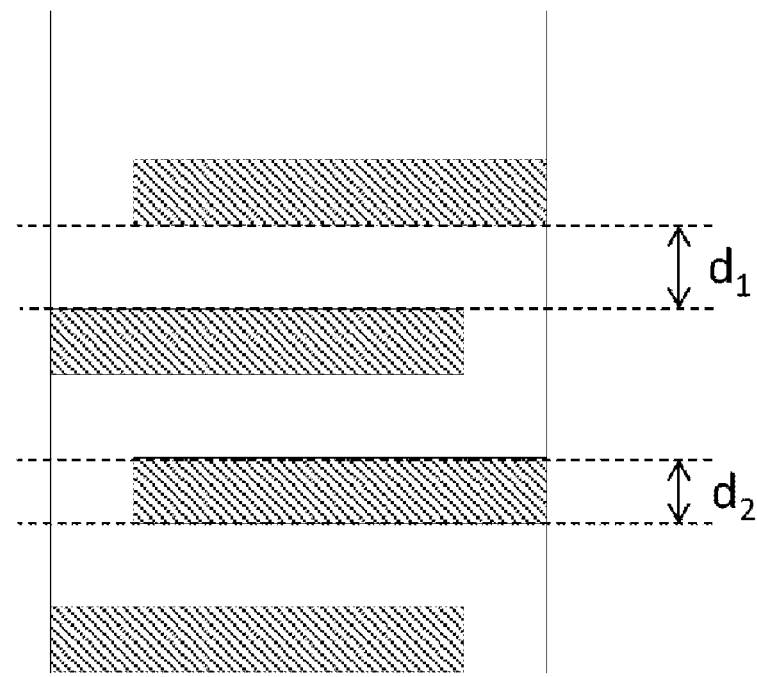
FIG. 2 schematically shows a further embodiment in which the teeth are widened to the width $d_2$ and have an essentially rectangular shape.

A preferred embodiment is shown in FIG. 2. It is based on the embodiment shown in FIG. 1 with two intermeshed, comb-like subelectrodes, but the teeth are broadened to form rectangles. The width of the rectangles $d_2$ is proportional to the area and can be in the same order of magnitude as the spacing $d_1$.

The ratio $d_1/d_2$ is preferably in the range from 20:1 to 1:20, more preferably from 10:1 to 1:10, in particular from 5:1 to 1:5. The ratio $d_1/d_2$ is the ratio of spacing and area of the two subelectrodes. Selection of this ratio makes it possible to set the relative contributions of the impedances arising between $Ref_1$ and $Ref_2$, as described in detail below.

Application to the Substrate

The two subelectrodes $Ref_1$ and $Ref_2$ have been applied to a substrate. The substrate can generally be a polymer film, for example composed of PET or polyolefin.

In one possible embodiment, the two subelectrodes are applied to a strip of film and the strip of film is introduced into the cell in such a way that the two subelectrodes face the separator in order to avoid electrical contact with the working electrode.

The strip of film is in this case preferably very narrow and thin in order to keep local disturbance as small as possible.

Preferred dimensions for the length and width of the section introduced are, for example, from 2 mm to 2 cm, preferably from 5 mm to 1 cm. The thickness can preferably be from 1 to 20 μm, preferably from 5 to 10 μm.

However, the use of a nonporous substrate such as a strip of film will always lead to a local change in the current density of the cell during operation, so that Li plating occurs at the margins of the reference electrode at an early juncture during charging of the cell. The reference electrode can therefore also be used as an early indicator for the detection of Li plating in this embodiment, in order possibly to allow the charging current to be reduced before plating occurs at further places in the cell. The suitability of the reference electrode for temperature determination via the conductivity of the electrolyte is not influenced, or influenced only negligibly, by this local disturbance occurring at the margins.

In a further embodiment, the separator of the cell can itself function as substrate. This embodiment is preferred since no additional layer of film is introduced and consequently the thickness of the cell is not increased and since the reference electrode can in principle extend over the entire area of the separator.

In addition, it is made possible in a simple way for a plurality of reference electrodes to be introduced into the cell by, for example, a plurality of spatially separated pairs of subelectrodes $Ref_1/Ref_2$ being applied simultaneously to different regions of the separator film. This makes it possible to achieve, for example, spatial resolution of the impedance measurement, or the reference electrodes can have a different geometry (e.g. different ratios of spacing and area) and thus be optimized for examining different phenomena or elements of the cell.

The separator is typically a porous polymer film, usually composed of polyethylene (PE) or polypropylene (PP). The separator can also be a shutdown separator which comprises a laminate of PP/PE/PP. PE has a lower melting point that PP, so that the PE layer can melt in the case of an abnormal temperature rise and close the pores of the PP layers ("shutdown effect"). In addition, the separator can also have a coating composed of ceramic material.

Figure 3:
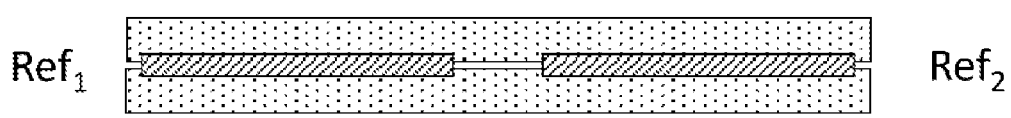
FIG. 3 schematically shows an embodiment in which the reference electrode is embedded between two layers of porous separator film.

The subelectrodes $Ref_1$ and $Ref_2$ can have been applied to the surface of the separator and have been provided with a covering layer which is permeable to lithium ions in order to effect electrical insulation. The covering layer can be a second layer of the separator film or be a coating comprising an electrically insulating, lithium ion-conducting material. In particular, the subelectrodes can be embedded between the layers when using a multilayer separator or a separator coated with ceramic material. FIG. 3 illustrates such an arrangement.

Figure 4:
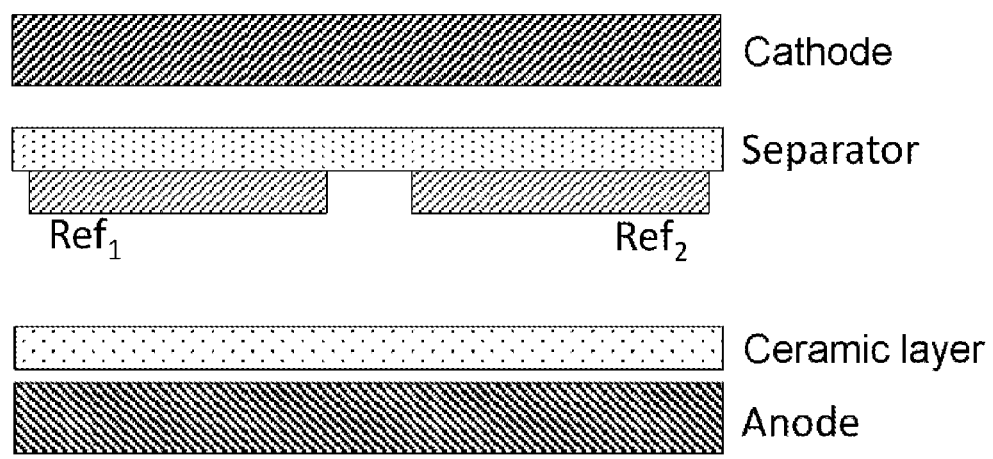
FIG. 4 schematically shows a further embodiment in which the reference electrode has been applied to one side of the separator as substrate. To provide electrical insulation from the anode, the latter is coated with a lithium ion-conducting ceramic.

As an alternative, a covering layer on the reference electrode can also be dispensed with. In this case, however, an appropriate covering layer, for example a coating comprising a ceramic lithium ion conductor, is to be provided on the working electrode of the cell adjoining the subelectrodes $Ref_1$ and $Ref_2$ in order to effect electrical insulation. This embodiment is shown in FIG. 4. The surface of the reference electrode can also be provided with a coating which is impermeable to Li ions.

A configuration in which charge exchange with the electrode is blocked is referred to below as blocking electrode and a configuration in which charge exchange is possible is referred to below as non-blocking electrode. In the case of metal electrodes which are in contact with the electrolyte, the ability for lithium ion exchange to occur depends on the applied potential which has to be low enough to make lithium plating or alloy formation possible. Thus, such an electrode can be operated either as blocking electrode or as non-blocking electrode as a function of the potential.

In the case of the blocking electrode, the subelectrodes lose their ability to be used as reference electrode since the electrochemical potential can no longer be determined. Measurement of the impedance between the two subelectrodes is nevertheless possible, with the impedance at the interfaces between subelectrode and electrolyte being purely capacitive.

The process for application to the substrate is not subject to any specific restrictions and can depend on the electrode material and the desired geometry. Preference is given to vapor deposition processes such as PVD, CVD, sputtering or the like. The desired geometry can be realized by use of masking techniques. As an alternative, ink jet printing processes, for example, are also possible.

The places of contact of the reference electrode can be provided, for example, in the form of widened contact pads which are then conducted out of the cell via, for example, film conductors or thin gold wires. As an alternative, the substrate can provide an overhang on which the places of contact are provided and which is conducted out of the cell. For this purpose, a sealable opening through which the conductors or strips of film are conducted can be provided in the housing of the cell, or a place of contact to which the places of contact of the reference electrode are joined in the interior of the housing and which provides appropriate connections outside on the housing can be provided.

Impedance Measurement

The reference electrode according to embodiments of the invention can be used in combination with any types of lithium ion cells, especially in cells having a liquid electrolyte of the roll type or stack type.

It is intended first and foremost for temperature determination, for detection of undesirable electrode phenomena such as Li plating and for determination of the Li ion concentration by way of impedance measurement. In addition, it can optionally also be used, for example between two impedance measurements, as reference electrode for measuring the half-cell potential relative to anode or cathode.

Figure 5:
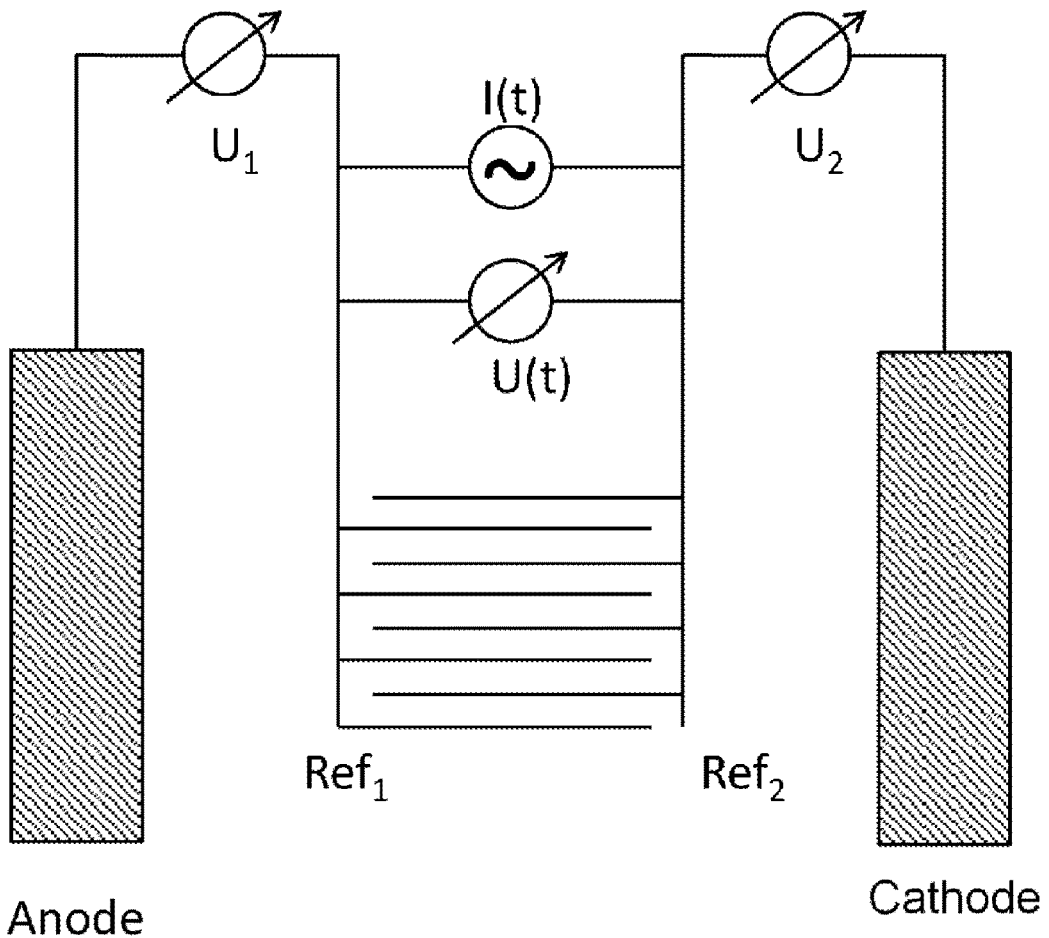
FIG. 5 is a sketch of the measurement arrangement for measuring the impedance between the subelectrodes $Ref_1$ and $Ref_2$ and optionally for measuring the half-cell potentials $U_1$ and $U_2$ using the reference electrode as reference electrode.

For use for impedance measurement, an excitation signal is applied between the two subelectrodes $Ref_1$ and $Ref_2$ and the response signal is measured. The excitation signal can be, for example, an alternating current signal I(t), while the potential U(t) is measured as response signal. The impedance is then calculated as Z=U(t)/I(t). The measurement arrangement is illustrated in FIG. 5.

Compared to conventional impedance measurement by application of the excitation signal to the working electrodes, the reference electrode according to embodiments of the invention has the advantage that a precise impedance measurement can be carried out with a smaller excitation current. This leads to improved accuracy in the temperature determination via the impedance and to improved local resolution. In addition, ageing phenomena of the electrolyte and/or the working electrode, in particular Li plating on the anode, for example, can be detected in a targeted manner using the electrode of embodiments of the invention by suitable choice of the geometry.

Figure 6:
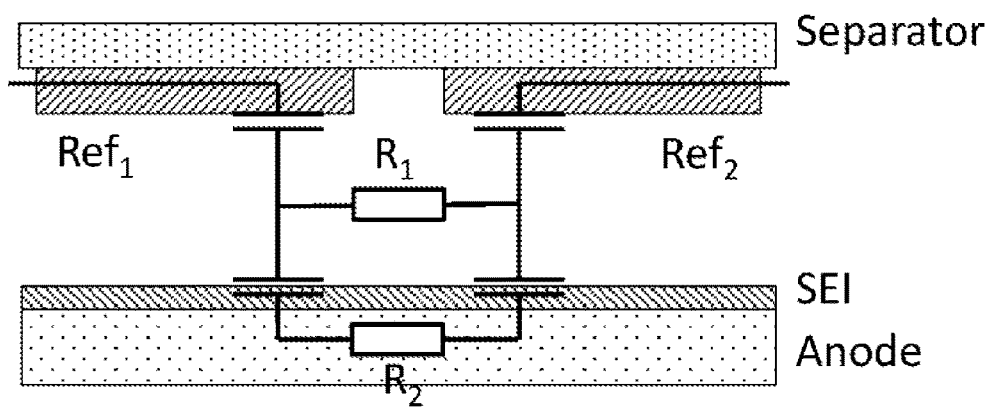
FIG. 6 shows a simplified equivalent circuit diagram for use of the electrode according to an embodiment of the invention. The ratio of $R_1$ and $R_2$ can, for example, be set via the electrode spacing and the electrode area of the subelectrodes $Ref_1$ and $Ref_2$ (or $d_1$ and $d_2$ in the case of the embodiment of FIG. 2).

FIG. 6 shows a simplified circuit diagram of the components which contribute to the impedance between $Ref_1$ and $Ref_2$. The interfaces between electrode and electrolyte can in the case of configuration as blocking electrode be modelled as purely capacitive resistances and the electrolyte or the active layer of the working electrode can be modelled as ohmic resistances, as shown in the figure.

At relatively high frequencies, the capacitive contributions become negligible, so that the impedance is determined essentially by the parallel ohmic resistances $R_1$ and $R_2$. $R_1$ is the resistance of the direct electrical connection from $Ref_1$ to $Ref_2$ through the electrolyte, and $R_2$ is the connection of $Ref_1$ to the working electrode and from this back to $Ref_2$. In other words, $R_1$ essentially represents the electrolyte resistance between $Ref_1$ and $Ref_2$ and $R_2$ represents essentially the resistance of the active layer of the working electrode.

What has been said above in respect of blocking electrodes also applies in an analogous way to non-blocking electrodes at high frequencies. Here, the interfaces are no longer purely capacitive, as shown in FIG. 6, but are instead represented as parallel connection of capacitive resistance and ohmic resistance, which reflects the charge exchange. At low frequencies, both parts are important for the impedance contribution of the electrode interface. At high frequencies, on the other hand, the capacitive part turns to zero while the ohmic part remains finite, so that the impedance of the parallel connection again becomes negligible. In this case, the total impedance is thus likewise determined by the two parallel resistances $R_1$ and $R_2$.

$R_1$ here depends both on the electrode area and on the spacing $d_1$ which indicates the distance travelled by the charge carriers in the electrolyte. $R_2$, on the other hand, is determined mainly by the electrical conduction through the active material layer in the thickness direction, while conduction occurs along the surface via the metallic power outlet lead, the resistance of which is negligible. $R_2$ thus depends to a good approximation solely on the electrode area.

The relative contribution of $R_1$ and $R_2$ to the impedance can be set by appropriate choice of the geometry, in particular the ratio of spacing $d_1$ and area of the reference electrode, e.g. by choice of the $d_1/d_2$ ratio in the case of the embodiment shown in FIG. 2. The electrolyte conductivity and the constitution of the working electrode can in this way be examined in a targeted manner in order to be able to arrive at a differentiated ageing diagnosis. Furthermore, it is also possible to use a plurality of reference electrodes according to embodiments of the invention having different spacing/area ratios (or $d_1/d_2$ ratios) which are, for example, applied together to the separator in order to be able to examine the two properties independently. When using a plurality of reference electrodes, these can also be actuated in succession, for example by being joined alternately to the excitation device and the measurement device in a multiplex process.

The excitation frequencies depend on the properties to be diagnosed and are generally in the range from 10 Hz to 20 kHz, preferably from 50 Hz to 10 kHz. To measure the electrolyte conductivity and detect any lithium plating on the anode, preference is given, as indicated above, to high frequencies of, for example, from 500 Hz to 20 kHz, more preferably from 1 kHz to 10 kHz, so that the impedance is determined essentially by the resistances $R_1$ and $R_2$. Should, on the other hand, properties related to charge exchange and the capacitive double layer on the electrodes be determined, for instance for studying the dielectric properties of the electrolyte and thus also the formation of possible covering layers or a change in the ion concentrations, use is made of low frequencies, for example in the range from 10 Hz to 1 kHz, preferably from 50 Hz to 500 Hz.

The signal level of the excitation signal is typically in the range from 1 to 50 mV. Preference is given to using levels of from 5 to 20 mV, for example about 10 mV, in order firstly to maintain the linearity of the system and secondly to keep the outlay for the measurement small. Relatively high amplitudes make better resolution possible at the expense of possible nonlinearity, whereas relatively low amplitudes make determination of the measured values more difficult.

In addition to the alternating current signal, a polarization potential can be applied between the two subelectrodes. In this way, it is possible to characterize the charge carrier double layer on the surfaces, which is dependent on the electrolyte composition, ion concentration and thus also on ageing.

Temperature Determination

The reference electrode of an embodiment of the invention can be used for determining temperature by way of impedance measurement using the known relationship between temperature and impedance T(Z). T(Z) is typically recorded in the form of look-up data and/or a calculation model in the battery management system, possibly as a function of further parameters such as SOC or ageing state.

The determination of T(Z) is known in principle. Thus, T(Z) can be determined, for example, by acquisition of calibration data in which the cell is brought to a particular temperature and a particular SOC and the impedance is measured. As an alternative or in combination therewith, T(Z) can also be calculated, for instance with the aid of an impedance model in combination with a known temperature dependence of the constituents of the model. For the temperature dependence of the impedance contributions which depend on the kinetics of the electrode processes, it is possible to use, for example, an Arrhenius relationship, and for the electrolyte conductivity it is possible to use the known temperature dependence of ion mobility as a basis.

Detection of Lithium Plating

In addition, the reference electrode of an embodiment of the invention is also particularly suitable for detecting undesirable electrode processes, such as the formation of defects in the interfacial layer between anode and electrolyte (SEI) or the deposition of metallic lithium (Li plating), which are associated with a change in the impedance.

Figure 7:
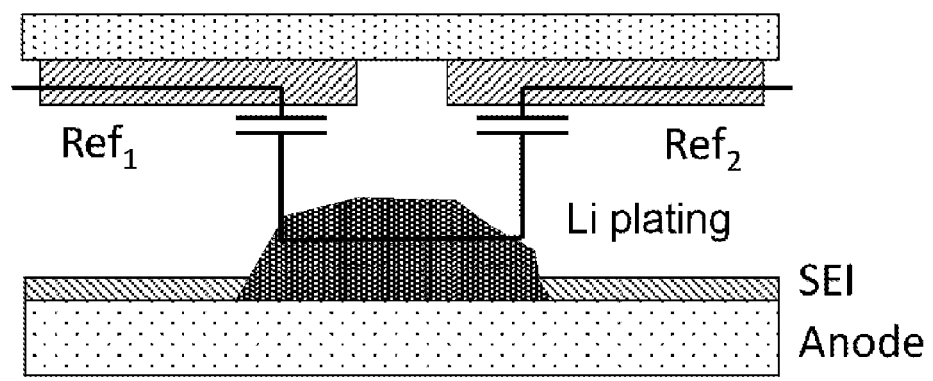
FIG. 7 schematically illustrates the detection of lithium plating with the aid of the reference electrode.

FIG. 7 illustrates this for the case of lithium plating, which is shown by a sharp drop in the impedance. This is caused by formation of a bridge of metallic Li between anode and one of the two subelectrodes $Ref_1$ or $Ref_2$, or between the two subelectrodes, as shown in the figure, which leads to a sharp decrease in the ohmic resistance or in the extreme case to a short circuit between the two subelectrodes.

In the case of lithium plating, the reference electrode additionally acts as defined point of disturbance, i.e. the deposition preferentially occurs firstly in the vicinity of the reference electrode, and/or dendrites of Li grow in the direction of the reference electrode, due to the electric field between reference electrode and anode, and the probability of deposition in other places is decreased. The reference electrode is therefore particularly suitable for early recognition of such lithium plating.

Determination of the Lithium Ion Concentration

The lithium ion concentration can be determined by examination of the dielectric properties at the interface of the subelectrodes. As indicated above, relatively low excitation frequencies at which the capacitive resistance does not vanish but is instead frequency-dependent with $-1/\omega C$, where C is the capacitance of the double layer, are typically used for this purpose. In addition, a variable direct potential signal (bias) superposed on the alternating signal can be applied to the electrode. Here, a bias potential of, for example, 200 mV is applied between the two electrodes, the alternating current impedance is determined and the alternating current impedance is subsequently determined again at a different bias potential of, for example, 400 mV. Since the magnitude of the charge carrier double layer depends on the polymerization potential and the ion concentration, the prevailing ion concentration can be determined from the dependence now determined on the polarization potential.

Use as Reference Electrode for Potential Measurement

In addition, the reference electrode of an embodiment of the invention can optionally also be used, for example between two impedance measurements, as reference electrode for measuring the half-cell potential relative to anode or cathode, as is likewise illustrated in FIG. 5. To provide a stable reference potential, a small amount of metallic lithium is firstly deposited on one or both subelectrodes (in-situ lithiation) so that the potential corresponds to that of $Li/Li^+$. The potential relative to the working electrode is then measured. Since the measurement occurs to a good approximation without current, the reference potential remains constant.

As an alternative to deposition of metallic lithium, lithium alloys can also be formed, depending on the material of the reference electrode (e.g. in the case of aluminum or gold). These alloys typically have a step-like course which is dependent on the lithium concentration. In such a case, it is advantageous to actuate a very pronounced potential step, (i.e. a potential step which prevails over a wide lithium concentration range and changes comparatively sharply at the margins) with high capacitance in order to avoid changes in the reference potential due to spontaneous discharge. In addition, metallic lithium can also be deposited on the alloy formed. In the case of materials such as copper which do not form an alloy, metallic lithium has to be deposited in any case. Furthermore, the availability of two subelectrodes can advantageously be used to detect spontaneous discharge of a subelectrode and recharge it.

What is claimed is:

1. A single, two-part, reference electrode comprising:
   a first subelectrode comprising a first electrical conductor; and
   a second subelectrode comprising a second electrical conductor, wherein
   the subelectrodes are arranged electrically separately from one another on a substrate and have an essentially constant spacing.

2. The single, two-part, reference electrode according to claim 1, wherein the spacing between the subelectrodes is between 10 µm and 1 mm.

3. The single, two-part, reference electrode according to claim 1, wherein:
   the subelectrodes are arranged opposite to one another,
   each of the subelectrodes has an essentially comb-like shape, and
   teeth of a comb of the first subelectrode intermesh with teeth of a comb of the second subelectrode, such that the teeth of the comb of the first electrode are separated from the teeth of the comb of the second electrode by the spacing.

4. The single, two-part, reference electrode according to claim 3, wherein each of the teeth has an essentially rectangular shape, and a tip of a tooth corresponds to a short side of the essentially rectangular shape.

5. The singe, two-part, reference electrode according to claim 4, wherein a width of the short side is between 10 µm and 1 mm.

6. The single, two-part, reference electrode according to claim 1, wherein each of the subelectrodes is made of a metallic conductor.

7. The single, two-part, reference electrode according to claim 6, wherein the metallic conductor is nickel, copper, silver, or gold.

8. The single, two-part, reference electrode according to claim 1, wherein each of the subelectrodes has a layer thickness between 10 nm and 5 µm.

9. The single, two-part, reference electrode according to claim 1, wherein the substrate is a porous separator film for a lithium ion cell.

10. The single, two-part, reference electrode according to claim 9, wherein the subelectrodes are embedded between a separator substrate film and a separator covering film.

11. The single, two-part, reference electrode according to claim 1, wherein the two-part reference electrode is a non-blocking electrode which allows charge exchange between the subelectrodes and surroundings of the two-part reference electrode.

12. The single, two-part, reference electrode according to claim 1, wherein the two-part reference electrode is a blocking electrode so that charge exchange between the subelectrodes and surroundings of the two-part reference electrode is blocked.

13. A separator film for a lithium ion cell, wherein the single, two-part, reference electrode according to claim 1 is applied to the separator film.

14. A lithium ion cell comprising:
   an anode;
   a cathode;
   a separator;
   an electrolyte; and
   at least the single, two-part, reference electrodes according to claim 1.

* * * * *